(12) United States Patent  
Cauchy

(10) Patent No.: US 6,301,194 B1
(45) Date of Patent: Oct. 9, 2001

(54) SELF-POWERED INSECT AND RODENT REPELLENT DEVICE

(76) Inventor: Charles J. Cauchy, 16663 Smokey Hollow Rd., Traverse City, MI (US) 49686

( * ) Notice: Subject to any disclaimer, the term of this patent is extended or adjusted under 35 U.S.C. 154(b) by 0 days.

(21) Appl. No.: 09/558,600

(22) Filed: Apr. 26, 2000

Related U.S. Application Data

(60) Provisional application No. 60/131,045, filed on Apr. 26, 1999.

(51) Int. Cl.[7] ............................. H04B 1/02; A01K 15/02
(52) U.S. Cl. ........................................ 367/139; 119/719
(58) Field of Search ..................... 367/139; 116/22 A; 43/132.1; 340/384.2; 119/719

(56) References Cited

U.S. PATENT DOCUMENTS

| 3,891,962 | * | 6/1975 | White | 119/174 |
| 4,689,776 | * | 8/1987 | Thorndyke | 367/139 |
| 5,214,411 | * | 5/1993 | Herbruck | 367/139 |
| 5,528,049 | * | 6/1996 | Callahan | 250/493.1 |

* cited by examiner

Primary Examiner—Ian J. Lobo
(74) Attorney, Agent, or Firm—Lynn E. Cargill; Mary H. Powell

(57) ABSTRACT

An improved insect and rodent repellent device is thermo-electrically powered and provides a means for ultrasonically repelling insects and rodents. The insect and rodent repellent device is environmentally sound and may use a multiplicity of low-grade heat sources for its operation. A heat source activates a thermoelectric device which generates electricity for operating an ultrasonic generator to produce sound frequencies which repel insects and rodents.

31 Claims, 2 Drawing Sheets

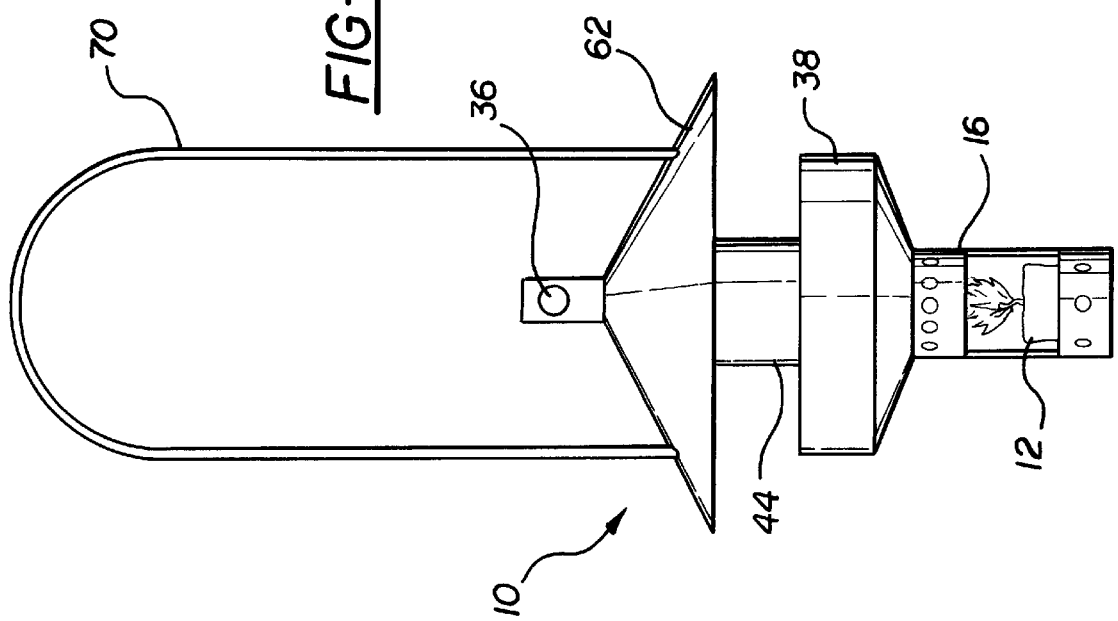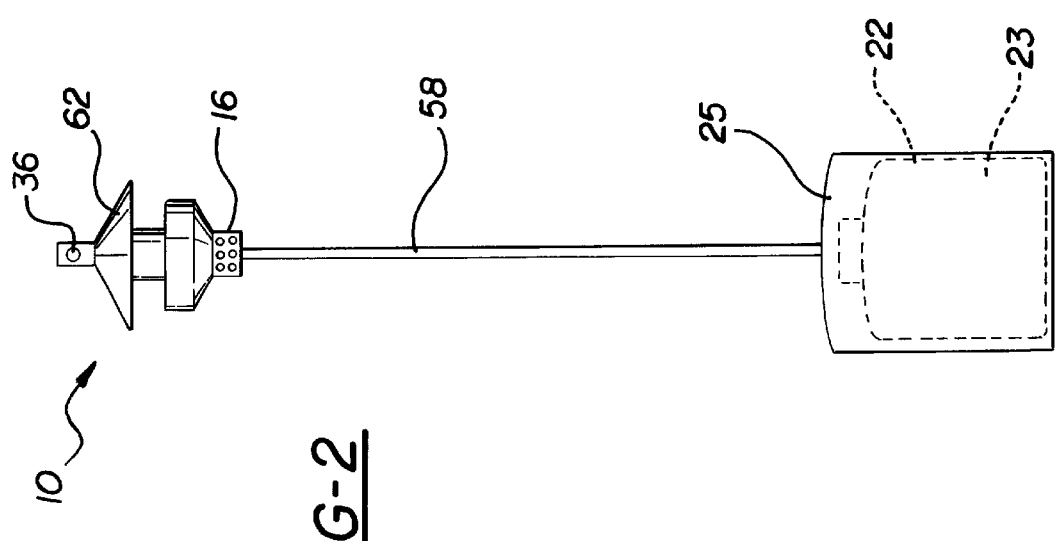

SELF-POWERED INSECT AND RODENT REPELLENT DEVICE

This application claims benefit of Prov. No. 60/131,045 filed Apr. 26, 1999.

TECHNICAL FIELD

The present invention relates generally to a self-powered means for repelling insects and rodents. More specifically, the repellent device of the invention is a thermoelectrically powered insect and rodent repellent device which uses an ultrasonic device to generate a repelling frequency.

BACKGROUND OF THE INVENTION

Insects, primarily mosquitoes, and rodents can be an annoyance for outdoor activities and pose a health danger due to the transmission of disease. Current technology for abating insects and rodents generally includes insecticides, insect repellents, insect electrocution devices, citronella candles, smoldering combustion materials, and collection devices. Many of these insect and rodent abatement devices are safe for neither humans nor the environment; they have limited mobility; and they have limited use time associated with their utilization. These are problems which the current invention solves. An ultrasonic insect and rodent abatement system which utilizes a low-grade heat source is desired.

The invention is adaptable for portability, daytime and nighttime use, camping, boating, use during natural disasters. This invention is environmentally sound and may use a multiplicity of low-grade heat sources for its operation. It is convenient to describe the invention with particular reference to a combustible gas heat source.

Prior art teachings, for example U.S. Pat. No. 5,528,049, issued to Phillip S. Callahan, assignor, on Mar. 16, 1995, discloses a frequency emitter for control of insects including a pumping radiation, with a molecular vibratory modulation or a scatter surface, to generate radiation frequencies to control or attract insects. The frequency emitter, however, does not disclose a low-grade heat source of power. Also, the frequency emitter does not disclose that it is capable of using a multiplicity of low-grade heat sources for its operation. Moreover, while thermoelectric devices are known which use a Seebeck effect to generate voltage potential, there is no disclosure nor suggestion of a thermoelectric powered generator insect and rodent abatement system.

Accordingly, it is a primary objective of the present invention to provide a self-powered ultrasonic insect and rodent repellent device which utilizes a low-grade heat source to power a thermoelectric generator which is thereby advantaged over current technology. The present invention addresses the need for a versatile and ecologically sound means to repel insects and rodents by utilizing an ultrasonic device combined with a thermoelectric generator. This invention can use a multiplicity of low-grade heat sources for its operation, giving it broad ranges of use, long-term use, portability and autonomy from the standard power grid. By combining an electronic ultrasonic repelling device with a thermoelectric solid-state power-generating device, a superior insect abatement system is achieved.

SUMMARY OF THE INVENTION

In accordance with a preferred embodiment of the invention, these and other objects and advantages are addressed as follows. An ultrasonic insect and rodent repellent device powered by a thermoelectric solid state generator having a heat source is disclosed, wherein the ultrasonic insect and rodent repellent includes a heat source, a heat source energized thermoelectric device for producing power which, in turn, activates an ultrasonic generator to produce sound frequencies for repelling insects and rodents. The thermoelectric device has a hot side and a cool side, one to be applied close to the heat source and the other to be as cool as possible under the circumstances. Disclosed are various sources of heat, various ignition sources for the heat source, the portability of the invention due to its non-reliance on an electrical power grid for operational power, various ways to use excess power generated and the use of a gas catalytic combustor.

In another embodiment of the present invention, the ultrasonic insect and rodent repellent device may include a heat collection plate to be put into communication with the thermoelectric device, such that the heat collection plate maintains a consistently high rate of heat transfer from the heat source and, therefore, enhances electrical energy production.

In still another embodiment of the present invention, the ultrasonic insect and rodent repellent device includes a finned heat sink on the cool side of the thermoelectric device, and the thermoelectric device is coupled to a direct current (DC) electric fan that is powered by a portion of the electrical energy produced by the thermoelectric device, and with the added air flow across the heat sink, provides improved cooling on the heat sink to maximize power generation by maintaining a high temperature differential across the thermoelectric device.

In yet another embodiment of the present invention, the mechanical and thermal connection of the hot side of the heat collection plate to the heat source is accomplished by means of mounting hardware.

In another embodiment of the present invention, the electrical output of the thermoelectric device is sufficient to produce a large enough electrical supply to power both the ultrasonic device and the cooling fan, thereby maximizing the frequency generation and the cooling efficiency of the system.

In another embodiment of the present invention, scents may be used in the combustion process to enhance the insect repelling effectiveness.

In still another embodiment of the present invention, a photoelectric detector may be utilized to automatically regulate gas flow and ignition during sunlight and nighttime hours to conserve fuel and prolong the useful operation of the device. The photoelectric device can detect the lack of sunlight and will turn on a switch that in turn can regulate a fuel valve to turn on the gas during low light periods. A battery-powered igniter may be used to restart combustion of the gas, which would now be available to the combustion area. It is anticipated that the battery can be trickle charged by the thermoelectric device during generator operation.

In yet another embodiment of the present invention, the ultrasonic frequency generation may be accomplished by the use of either single directional large field or multidirectional large field generators. In the case of mosquito repelling ultrasonic devices, the ultrasonic device mimics the vibration of a male mosquito, i.e. 330 wing beats per second. This drives off female mosquitoes and stops them from biting. Such ultrasonic devices often operate in the high frequency sound range of approximately 15–40 KHz. Such a frequency generator will find particular utility in the present invention.

BRIEF DESCRIPTION OF THE DRAWINGS

The nature and extent of the present invention is clear from the following detailed description of the particular embodiments thereof, taken in conjunction with the appendent drawings, in which:

FIG. 2 is a front view of a second embodiment of the ultrasonic insect and rodent repellent device constructed in accordance with the present invention; and FIG. 3 illustrates another embodiment of the present ultrasonic insect and rodent repellent device.

DETAILED DESCRIPTION OF THE INVENTION

Figure 1:
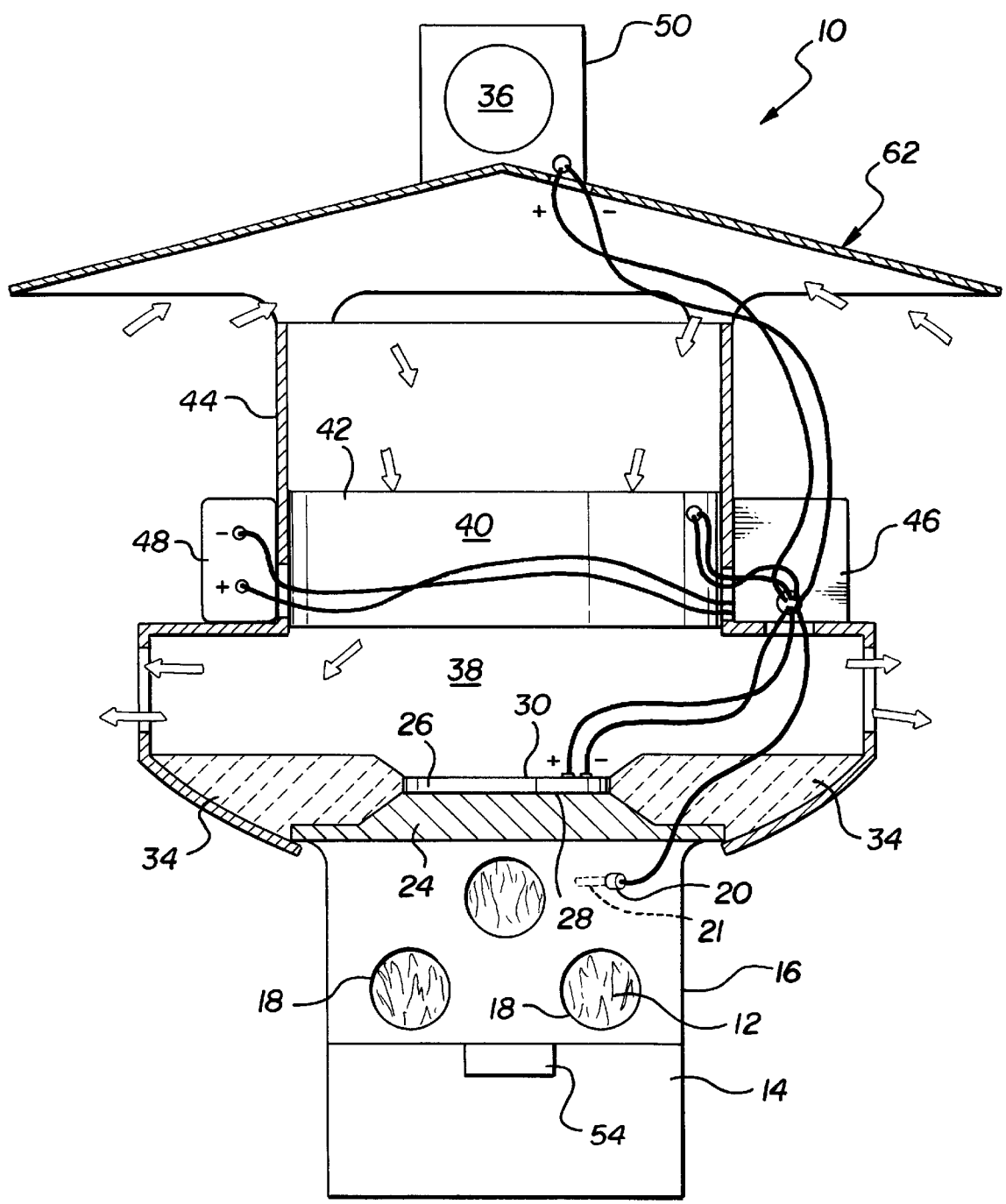
FIG. 1 is a cross-sectional view of a first embodiment of the present ultrasonic insect and rodent repellent device.

In accordance with a preferred embodiment of the present invention, FIG. 1 discloses a self-powered ultrasonic insect and rodent repellent device, is generally denoted by the numeral 10. In the preferred embodiment, the insect and rodent repellent device 10 includes a heat source 12, a combustion source 14 and a chamber 16 made of a material tolerant of combustion. Preferably, chamber 16 is made of a metal tolerant to combustion and lightweight, such as aluminum. There is a vent 18 in the chamber 16 for air to flow in and support combustion and to allow the outflow of combustion products so as not to smother the combustion process. The combustion in the chamber 16 is shown as a direct flame. If a light-producing heat source is used, the light can be contained in a light-transmitting chamber to also provide illumination in addition to its duties as a heat source. A catalytic combustor, rather than a direct flame, may also be used. Protruding into the chamber 16 is an igniter 20. Igniter 20 is a high voltage type that causes a spark via the flow of electrons between an igniter tip 21 and the chamber 16 which is made of metal. It will be understood that a piezoelectric igniter or any other type of igniter for igniting the flame can be used for manually starting combustion. It will also be understood that there is flexibility in the orientation of the chamber 16 relative to the igniter 20.

The thermoelectric device to be used may be of the plate-type available from Tellurex Corporation of Traverse City in Michigan, although the present invention envisions the use of any type of thermoelectric device. The thermoelectric device may be a bismuth-tin-antimony alloy, or any other known thermoelectric material. More than one device may be utilized. The preferred thermoelectric device for producing power is composed of a plurality of Seebeck thermoelectric couples which are connected in electrical series and electrical parallel combinations so as to produce voltage and current required by the ultrasonic generator.

In thermal communication with heat source 12, a heat collection plate 24 may also be used which is thermally conductive, tolerant of combustion and sized to efficiently concentrate and transfer heat from heat source 12 to thermoelectric device 26. Such a heat collection plate may be constructed of aluminum. A heat collection plate 24 which is finned can enhance heat energy extraction from heat source 12. Tapering the thickness of heat collection plate 24 would provide increased separation between heat collection plate 24 and a heat sink 38 to provide an increased cavity for insulation 34 to surround thermoelectric device 26, enhancing the flow of heat through the thermoelectric device 26. The insulation 34 surrounding the thermoelectric device reduces heat transfer from the heat source to the heat sink and to concentrate the heat transfer from the heat source to the thermoelectric device. The insulation 34 should be made of material that is combustion tolerant, such as a ceramic material, like fiber or tiles.

In direct thermal contact and communication with heat collection plate 24 is hot side 28 of the thermoelectric device 26. Thermoelectric device 26 has a hot side 28 in communication with heat collection plate 24 and a cool side 30 in communication with heat sink 38 which may be finned and made of a metallic material to aid in cooling the cool side of the thermoelectric device. A heat pipe could also be used as heat sink 38. Heat sink 38 may be of a finned design and positioned to efficiently dissipate heat into the air that is forced through heat sink 38. When heat flows through thermoelectric device 26 from heat collection plate 24 to heat sink 38, a temperature differential exists between hot side 28 and cool side 30 of the thermoelectric device 26, whereby electrical energy is produced by standard thermoelectric means.

Cool side 30 of thermoelectric device 26 is kept cool by a cooling source 40, such as a direct current electric fan 42 for drawing air through fan tube 44 which is fluidly connected to the outside air and propels air through heat sink 38. Fan tube 44 terminates well above the heat exhaust air area so as to separate incoming air and outgoing air. This separation improves the efficiency of the invention by preventing sources of warm air, including warm combustion products and heat sink 38 warm air, from mixing sufficiently with incoming air. Exhaust air from heat sink 38 drives air out from the system and thereby also removes combustion exhaust gas.

Electrical energy that is produced by the thermoelectric device 26 is generally sufficient to power both the direct current (DC) electric fan 42 and the ultrasonic frequency generator. This generated electrical energy powers ultrasonic generator 36 via an electronic and electrical control 46. If additional electrical power remains after powering both those devices, then it can be used to recharge a battery. Use of a plurality of thermoelectric devices 26 is within the scope of this invention. In addition, the thermoelectric device can also operate a light emitting diode when the operating potential of the thermoelectric device is reached.

As a further embodiment, weather hood 62 is connected to fan tube 44 in a manner which partially blocks air from entering fan tube 44. The blocked section of fan tube 44 is directly above heat sink 38 exhaust area and chamber 16 exhaust area. Such an embodiment permits air to flow into fan tube 44 section which is not blocked by weather hood 62. Preferably, unblocked fan tube 44 section has a center of air flow positioned ninety degrees from the center of heat sink 38, and exhausts in the plane of hot side 28 of thermoelectric device 26, so that air entering fan tube 44 is not mixed with exhaust from either heat sink 38 or heat source 12. Weather hood 62 is composed of material sufficient to protect electric fan 42 motor, electronic and electronic control 46, battery 48 and heat sink 38 from outdoor elements such as rain and snow.

Attached to weather hood 62 is an ultrasonic generator 36 that can be used to repel insects, rodents and other unwanted pests. Ultrasonic generator 36 can be rigidly or flexibly attached to weather hood 62 or anywhere else in close proximity to the thermoelectric device. Ultrasonic generator 36 can be unidirectional, and preferably multi-directional to project ultrasonic waves 360 degrees.

In FIG. 1, a photoelectric detection device 50 for indicating brightness of sunlight is shown as being located above the ultrasonic generator 36 and may be connected to electronic and electrical control 46. In times of low sunlight brightness, such as dusk when the action of a mosquito repellent device is needed the most, photoelectric detector device 50 can trigger fuel valve 54 to open and igniter 20 to ignite the gas which is now flowing through the opened fuel valve. The fuel valve is preferably powered by battery 48. In other variations of the invention, gas flow can either operate continuously, gas flow can be manually turned on and off, or a manual piezoelectric igniter can initiate combustion in chamber 16. Therefore, the heat source can be activated by the photoelectric means. The thermoelectric device can be used to charge battery 48 as the means for generating a spark for igniting combustible gas, if that is the heat source being utilized.

Igniter 20 is battery powered, such as by battery 48 which may be of the rechargeable type. During thermoelectric generation of electricity, battery 48 can be charged to hold electrical energy in storage until required for powering igniter 20. Electronics required for enhancing the voltage to a high enough level to generate a spark in the igniter is contained within electric and electronic controls, as indicated in FIG. 1.

Viewing FIG. 2 in conjunction with FIG. 1, elements of the invention shown in FIG. 1 are connected to a fuel source 22 from gas tank 23. Preferably, gas tank 23 is a 20-pound propane tank decoratively enclosed in a gas tank enclosure 25 made of metal or plastic providing itself as a stand for the device of the present invention. Gas tank 23 can act as ballast for stability. Ultrasonic device support post 58 may be made of metal or plastic, and the post may enclose a fuel supply tube attached to igniter 20. In this embodiment of the invention, the complete assembly of the thermoelectric device, the ultrasonic generator 36, the support post 58, the gas tank 23, and the gas tank enclosure 25, comprises a stand-alone insect and rodent repellent device.

FIG. 3 shows a modification of ultrasonic insect and rodent device 10 illustrated in FIG. 1. While FIG. 1 shows combusted gas as the heat source 12 for the solid-state thermoelectric generator 26, in FIG. 3, the heat source 12 in chamber 16 is a candle. Such a heat source 12 may also include, although it is not limited to, a spirit lamp, a kerosene lantern, a camping lantern, a camp stove, a wood stove, a campfire, a gas or charcoal grill, or any type of gas burner which may burn propane, butane, natural gas or any other type of combustible fluid, among other common heat sources known to those of ordinary skill in the art. Combustion chamber 16 is sized and vented to support combustion from the candle. In addition, heat source 12 from the candle can also provide illumination, particularly when the combustion tolerant material of chamber 16 is transparent such as glass. Further, candle heat source 12 may be formulated with known insect repelling properties, including insect or rodent repelling chemicals, as well as scented properties to further enhance the repellent activity. As can be seen from FIG. 3, a bale 70 may be attached for hanging the ultrasonic insect and rodent repellent device, such as may be desirable in camping situations, or for hand carrying of the device.

While the above description refers to the use of the invention for abating insects and rodents, primarily mosquitoes, it is within the scope of this invention to use an ultrasonic generator of such a frequency and a plurality of frequencies to abate additional pests which respond to ultrasonic sound waves.

While the invention has been described in terms of a specific embodiment, it will be appreciated that other embodiments could readily be adapted by one skilled in the art, including rearrangement of elements, without departing from the scope of the following claims. Accordingly, the scope of the invention is to be limited only by the following claims.

I claim:

1. A self-powered ultrasonic insect and rodent repellent device, comprising:
    a heat source;
    a thermoelectric device for producing power, said thermoelectric device having a hot side and an opposing cool side; and
    an ultrasonic generator powered by the thermoelectric device, whereby the thermoelectric device is activated by the heat source to generate electricity for activating the ultrasonic generator to produce sound frequencies which repel insects and rodents.

2. The ultrasonic insect and rodent repellent device of claim 1, further comprising a heat sink positioned adjacent to the thermoelectric device to improve the efficiency of the thermoelectric device by enhancing temperature difference.

3. The ultrasonic insect and rodent repellent device of claim 2, further comprising a cooling source.

4. The ultrasonic insect and rodent repellent device of claim 1, wherein the heat source is a combustion source housed in a chamber composed of a material which is tolerant of combustion.

5. The ultrasonic insect and rodent repellent device of claim 4, wherein the heat source is housed in a chamber composed of aluminum.

6. The ultrasonic insect and rodent repellent device of claim 4, wherein the chamber for the combustion source is selectively vented to support combustion.

7. The ultrasonic insect and rodent repellent device of claim 1, further comprising an igniter for the heat source, said igniter being selected from the group consisting of high voltage igniters and piezoelectric igniters.

8. The ultrasonic insect and rodent repellent device of claim 1, wherein the thermoelectric device is powered by the heat source, said heat source being selected from the group consisting of candle, spirit lamp, gas camp lantern, camp stove, wood stove, campfire gas, charcoal grill, propane, butane, natural gas burner, and catalytic igniters.

9. The ultrasonic insect and rodent repellent device of claim 8, wherein the heat source is preferably propane.

10. The ultrasonic insect and rodent repellent device of claim 1, wherein the thermoelectric device for producing power is composed of a plurality of Seebeck thermoelectric couples which are connected in electrical series and electrical parallel combinations so as to produce voltage and current required by the ultrasonic generator.

11. The ultrasonic insect and rodent repellent device of claim 2, further comprising insulation surrounding the thermoelectric device to reduce heat transfer from the heat source to the heat sink and to concentrate heat transfer from the heat source to the thermoelectric device.

12. The ultrasonic insect and rodent repellent device of claim 11, wherein the insulation is a ceramic material.

13. The ultrasonic insect and rodent repellent device of claim 2, wherein the heat sink is metallic to aid in cooling the cool side of the thermoelectric device.

14. The ultrasonic insect and rodent repellent device of claim 2, wherein the heat sink is a heat pipe heat sink.

15. The ultrasonic insect and rodent repellent device of claim 2, wherein the heat sink is finned to enhance warm air exhaustion.

16. The ultrasonic insect and rodent repellent device of claim 1, further comprising a thermally conductive heat collection plate located between the heat source and the thermoelectric device to concentrate heat transfer at the thermoelectric device for enhanced heat energy flow through the thermoelectric device and thereby increasing electron flow within the thermoelectric device.

17. The ultrasonic insect and rodent repellent device of claim 16, wherein the heat collection plate is tapered in thickness to increase separation between the heat collection plate and the heat sink.

18. The ultrasonic insect and rodent repellent device of claim 16, wherein the heat collection plate is in connection with the heat source by means of mounting hardware.

19. The ultrasonic insect and rodent repellent device of claim 3, wherein the cooling source is a direct current electric fan powered by the thermoelectric device.

20. The ultrasonic insect and rodent repellent device of claim 3, wherein the cooling source includes a fan tube to assist in drawing air into the heat sink.

21. The ultrasonic insect and rodent repellent device of claim 1, wherein the thermoelectric device operates a light emitting diode when the operating potential of the thermoelectric device is reached.

22. The ultrasonic insect and rodent repellent system of claim 8, wherein the heat source is activated by a photoelectric means.

23. The ultrasonic insect and rodent repellent device of claim 1, wherein the thermoelectric device for producing power is also used to charge a battery for producing electricity.

24. The ultrasonic insect and rodent repellent device of claim 23, further comprising a fuel valve, said fuel valve having a regulating switch, and said fuel valve being powered by the battery.

25. The ultrasonic insect and rodent repellent device of claim 4, wherein the heat source in the chamber also provides illumination.

26. The ultrasonic insect and rodent repellent device of claim 25, wherein the chamber contains a transparent, combustion tolerant material which transmits illumination.

27. The ultrasonic insect and rodent repellent device of claim 26, wherein the transparent material in the chamber is glass.

28. The ultrasonic insect and rodent repellent device of claim 1, wherein the heat source contains chemicals to repel insects and rodents.

29. The ultrasonic insect and rodent repellent device of claim 1, wherein the heat source contains a material with scented properties.

30. The ultrasonic insect and rodent repellent device of claim 1, further comprising a support post attached to the ultrasonic generator.

31. The ultrasonic insect and rodent repellent device of claim 1, further comprising a bale attached thereto for hanging the ultrasonic insect and rodent repellent device.

* * * * *